United States Patent
Ma et al.

(10) Patent No.: US 6,832,919 B2
(45) Date of Patent: Dec. 21, 2004

(54) LAND GRID ARRAY SOCKET WITH REINFORCING PLATE

(75) Inventors: Hao-Yun Ma, Tu-Chen (TW); Ming-Lun Szu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/604,872

(22) Filed: Aug. 22, 2003

(65) Prior Publication Data

US 2004/0115966 A1 Jun. 17, 2004

(30) Foreign Application Priority Data

Dec. 17, 2002 (TW) ..................................... 91220447 U

(51) Int. Cl.⁷ .............................................. H01R 12/00
(52) U.S. Cl. ..................... 439/73; 439/264; 439/330; 439/525; 439/526
(58) Field of Search ............................ 439/70–74, 264, 439/330, 525, 526

(56) References Cited

U.S. PATENT DOCUMENTS

| | | |
|---|---|---|
| 4,504,105 A | 3/1985 | Barkus et al. |
| 4,621,884 A | 11/1986 | Berkebile, Jr. et al. |
| 4,692,790 A | 9/1987 | Oyamada |
| 5,302,853 A | 4/1994 | Volz et al. |
| 5,344,334 A * | 9/1994 | Laub et al. .................. 439/331 |
| 5,761,036 A * | 6/1998 | Hopfer et al. ............... 361/704 |
| 6,692,279 B1 * | 2/2004 | Ma ............................ 439/331 |

* cited by examiner

Primary Examiner—Truc T. T. Nguyen
(74) Attorney, Agent, or Firm—Wei Te Chung

(57) ABSTRACT

An LGA socket (1) includes a slab like insulative housing (11), a reinforcing plate (12) attached on an exterior surface of the housing, and a clip (14) and a lever (15). The clip and the lever are respectively mounted on two opposite ends of the housing to fasten an LGA package. The lever includes a driver portion (151), a driven portion (152) adjoining the driver portion, and a baffle (124) extending from a side of the reinforcing plate. The baffle prevents the lever from breaking away from the housing. After the LGA package is positioned on the housing, the rigidity of the housing is improved with the reinforcing plate made of rigid material being equipped on the housing. Steady electrical connection between the contacts pads of the LGA package and respective contacts of the housing is ensured.

2 Claims, 4 Drawing Sheets

LAND GRID ARRAY SOCKET WITH REINFORCING PLATE

BACKGROUND OF INVENTION

1. Field of the Invention

The present invention relates to electrical connectors, and more particularly to a land grid array (LGA) socket for electrically connecting a land grid array (LGA) package to a printed circuit board (PCB).

2. Description of Related Art

An integrated circuit (IC) package having contact pads arranged on a bottom surface thereof in a land grid array (LGA) is known as an LGA package. LGA packages have relatively low height, which saves valuable space in electronic assemblies.

Connectors for removably mounting an LGA package on a PCB are known as LGA sockets. An LGA socket assembly typically comprises an insulative housing, which is positioned between the LGA package and the PCB. The housing defines an array of passageways receiving electrical contacts therein. The contacts correspond with the array of contact pads of the LGA package. Each contact has a pair of opposite free ends that project beyond opposite external surfaces of the housing. Prior to mounting of the LGA package, the free ends are spaced apart a predetermined distance. The free ends are respectively engaged with corresponding contact pads of the LGA package, and soldered to contact pads on a mounting surface of the PCB. The LGA package is positioned on the housing, and the contact pads of the LGA package rest on the contacts of the housing. Thereupon, it is necessary to exert a force upon the LGA package to maintain firm electrical connection between the contacts pads of the LGA package and the respective contacts of the housing. The force is powerful enough to maintain the electrical connection between the contacts pads and the contacts.

Various LGA sockets comprising a cover slidably mounted on the housing to provide the force are disclosed in, for example, U.S. Pat. Nos. 4,504,105, 4,621,884, 4,692,790, 5,302,853, and 5,344,334. Referring to FIG. 1, a typical such LGA socket 9 comprises a cover 93 and a metallic lever 92 respectively mounted to opposite ends of a housing 91. The end of the housing 91 mounted with the cover 93 defines a pair of troughs mating with a pair of corresponding hooks extending from an end of the cover 93. The opposite end of the housing 91 forms a pair of braces holding the lever 92. A pair of protuberances 911 is respectively defined on the surfaces of the braces, the protuberances 911 holding the lever 92 in a horizontal position.

The housing 91 and the protuberances 911 are made of plastic, and the protuberances 911 wear out after repeated use of the lever 92. When the protuberances 911 have become too small, they can no longer reliably retain the lever 92. Opposite lateral sides of the cover 93 are bent slightly downwardly to form a pair of clasping portions. When the LGA socket 9 is not in use, the cover 93 is rotated down onto the housing 91, and the clasping portions rest on a top surface of the housing 91.

In use, an LGA package 8 is positioned on the housing 91. The cover 93 is rotated down onto the LGA package 8, with the clasping portions resting on the LGA package 8. The lever 92 is rotated down, and engages with a free end of the cover 93. The lever 92 thus presses the clasping portions of the cover 93 onto the LGA package 8.

Because the lever 92 presses down on the cover 93, and the clasping portions of the cover 93 press down on the LGA package 8, the lever 92 simultaneously pulls up the end of the housing 91 thereat to counterbalance the pressing forces. In addition, the hooks of the cover 93 tend to pull up the end of the housing 91 thereat, to counterbalance the pressing forces of the clasping portions of the cover 93.

Generally, the force required for the clasping portions of the cover 93 to firmly retain the LGA package 8 thereunder is considerable. Accordingly, the pressing force applied by the lever 92 on the cover 93 is also considerable. The result is that the pulling up force of the lever 92 is considerable, and the pulling up force of the cover 93 is also considerable.

Said pulling up forces operate on the opposite ends of the housing 91 respectively, and the pressing forces of the clasping portions of the cover 93 operate to press a center portion of the housing 91 downward. Because the housing 91 is made of plastic, it has limited rigidity. As a result, the opposite ends of the housing 91 tend to bend upward. The forces applied by the clasping portions of the cover 93 on the LGA package 8 are decreased. The upshot is that firm and reliable electrical connection between the contacts pads of the LGA package 8 and the contacts of the housing 91 is diminished.

SUMMARY OF INVENTION

It is therefore an object of the present invention to provide an LGA socket for electrically connecting a land grid array (LGA) package to a printed circuit board (PCB), wherein contacts pads of the LGA package can be firmly and reliably connected with respective contacts of the LGA socket.

To achieve the above object, an LGA socket assembly of the present invention is provided for electrically connecting a land grid array (LGA) package to a printed circuit board (PCB) The LGA socket comprises a slab like insulative housing, a reinforcing plate attached on an exterior surface of the housing, and a clip and a lever. The clip and the lever are respectively mounted on two opposite ends of the housing to fasten an LGA package. The lever includes a driver portion, a driven portion adjoining the driver portion, and a baffle extending from a side of the reinforcing plate. The baffle prevents the lever from breaking away from the housing. After the LGA package is positioned on the housing, the rigidity of the housing is improved with the reinforcing plate made of rigid material being equipped on the housing. Steady electrical connection between the contacts pads of the LGA package and respective contacts of the housing is ensured.

Other objects, advantages and novel features of the invention will become more apparent from the following detailed description when taken in conjunction with the accompanying drawings.

DETAILED DESCRIPTION

Reference will now be made in detail to the preferred embodiment of the present invention.

Figure 1:
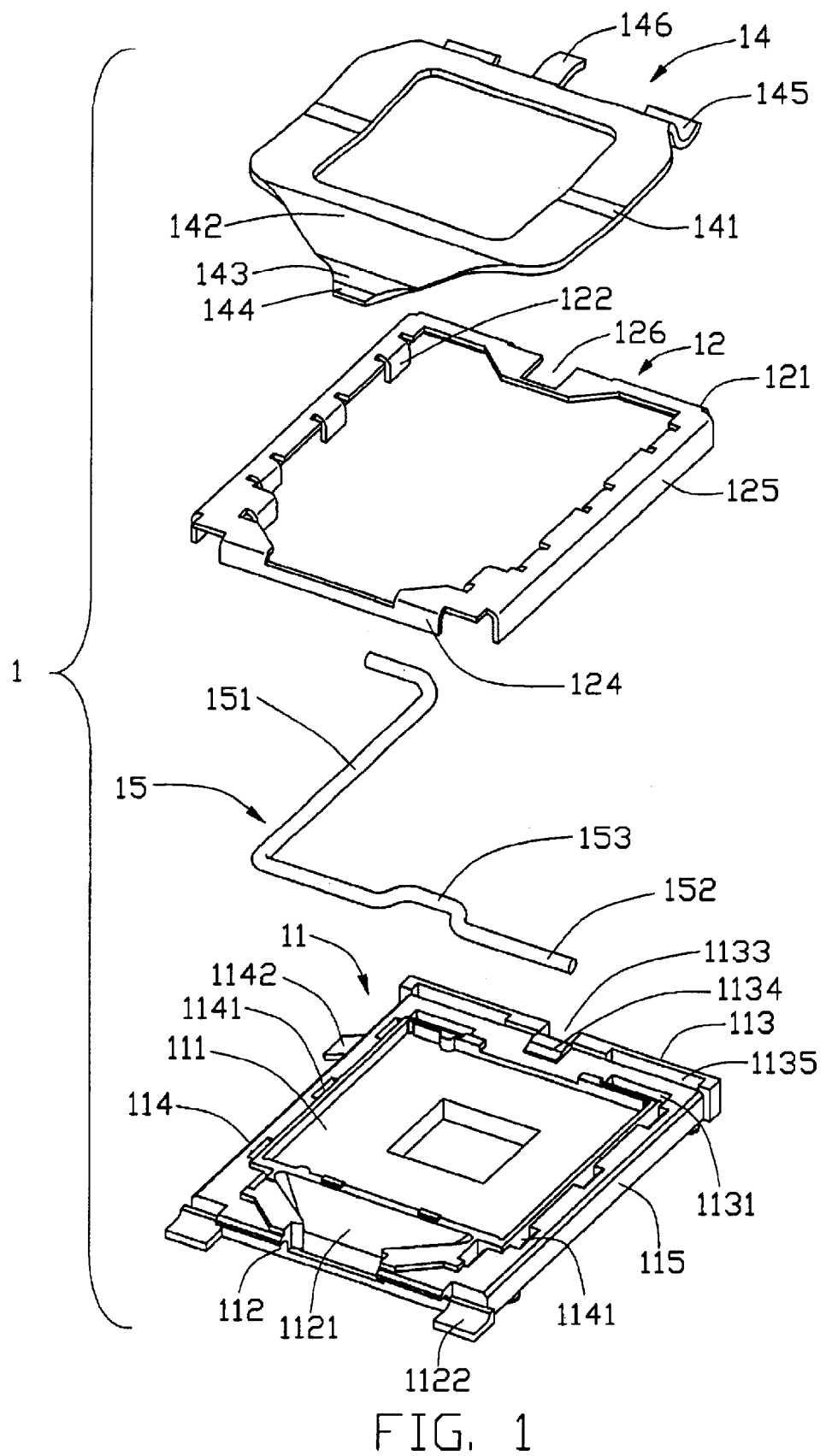
FIG. 1 is an exploded, isometric view of an LGA socket in accordance with the present invention.
Figure 2:
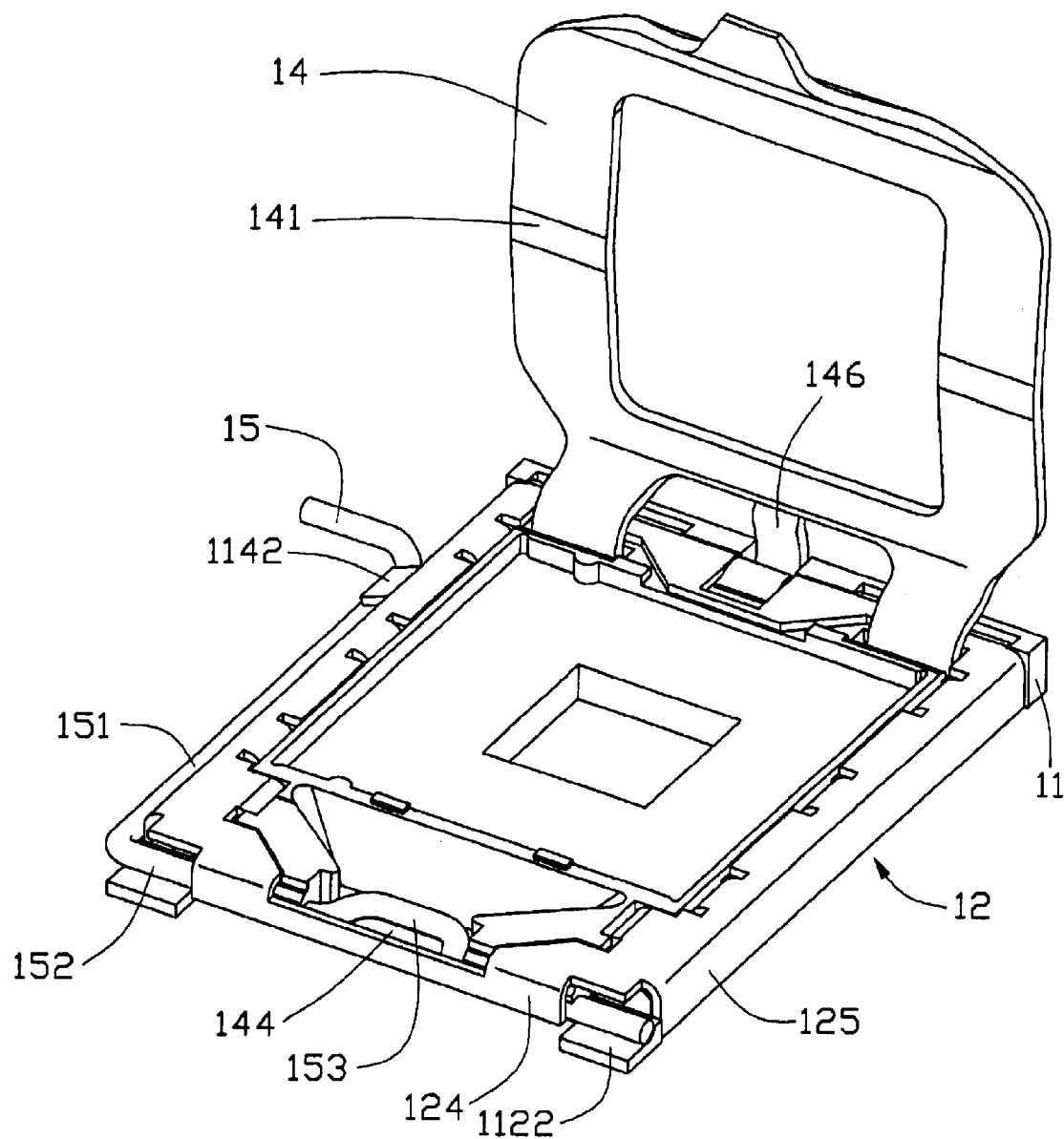
FIG. 2 is an assembled view of FIG. 1, showing the LGA socket in an open position.
Figure 3:
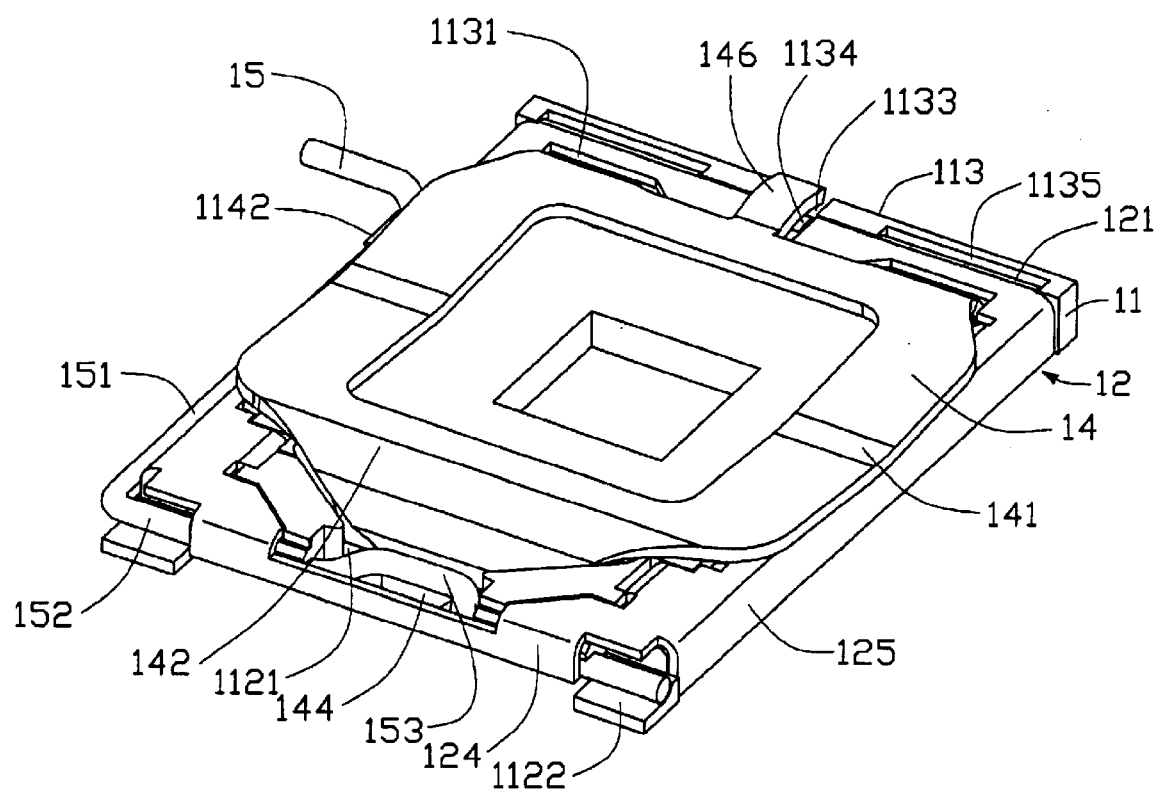
FIG. 3 is similar to FIG. 2, but showing the LGA socket in a closed position.
Figure 4:
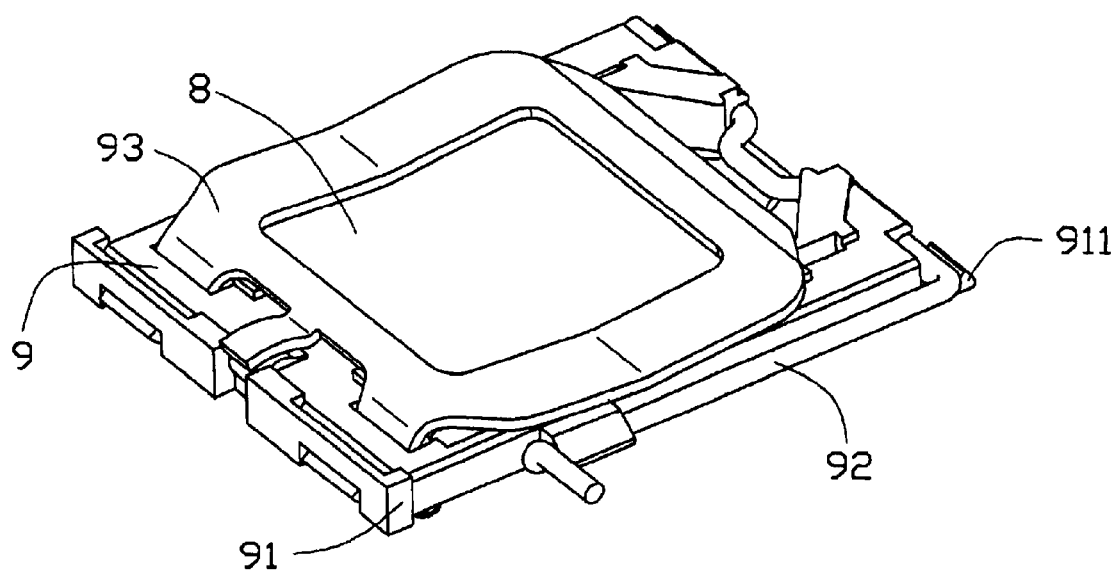
FIG. 4 is an isometric view of a conventional LGA socket with an LGA package received therein.

Referring to FIGS. 2 to 4, an LGA socket 1 in accordance with a preferred embodiment of the present invention includes a generally rectangular insulative housing 11 receiving a multiplicity of electrical contacts (not shown), a reinforcing plate 12 attached on a exterior surface of the housing 11, and a clip 14 and a lever 15 respectively mounted to opposite ends of the housing 11.

The housing 11 defines an electric section 111, which includes a multiplicity of contact-receiving passages (not shown) defined therein. A multiplicity of corresponding electrical contacts (not shown) is received in the contact-receiving passages (not shown). The housing 11 defines a front side 112, a rear side 113, a left side 114, and a right side 115 therearound.

The housing 11 defines a generally trapezoidal clip-receiving trough 1121 in the front side 112 thereof. The clip-receiving trough 1121 defines a pair of opposite openings in opposite external surfaces of the housing 11. A pair of braces 1122 extends from two opposite ends of the front side 112 respectively, for holding the lever 15.

The housing 11 defines a pair of first troughs 1135 and a pair of mounting troughs 1131 in the rear side 113 thereof. The mounting troughs 1131 are parallel to the first troughs 1135, and located between the first troughs 1135 and the electric section 111. A notch 1133 is defined in a center of the rear side 113, and a curved holding surface 1134 is formed on the rear side 113 beside the notch 1133.

A slanted locking hook 1142 is defined on the left side 114 of the housing 11. A plurality of second troughs 1141 is defined in the left and right sides 114, 115 of the housing 11.

The electrical contacts received in the housing 11 are soldered to contact pads on a mounting surface of the PCB. An LGA package (not shown) is positioned on the housing 11, with contact pads of the LGA package engaging with the contacts of the housing 11.

The reinforcing plate 12 is made of metal in the preferred embodiment, and it alternatively can be made of other rigid material. The reinforcing plate 12 is generally a rectangular frame. A pair of first tabs 121 depends from one end of the reinforcing plate 12, the first tabs 121 engaging in the corresponding first troughs 1135 of the housing 11. A baffle 124 depends from an opposite end of the reinforcing plate 12. A pair of sidewalls 125 depends from opposite lateral sides of the reinforcing plate 12, the sidewalls 125 covering lateral faces of the left and right sides 114, 115 of the housing 11. A plurality of second tabs 122 depends from two inner lateral edges of the reinforcing plate 12, the second tabs 122 engaging in the corresponding second troughs 1141 of the housing 11. A gap 126 is defined in a middle of said one end of the reinforcing plate 12 between the first tabs 121, corresponding to the notch 1133 of the housing 11.

The baffle 124 of the reinforcing plate 12 is located between the braces 1122 of the housing 11 and stay a gap toward the front side 112 of the housing 11.

The clip 14 is generally a rectangular frame. Opposite lateral sides of the clip 14 are bent slightly downwardly to form a pair of clasping portion 141. An engagement portion 142 extends from one end of the clip 14. A free end of the engagement portion 142 forms a substantially flat engagement end 143 having a flat engagement surface 144, the engagement surface 144 engaging with the lever 15. A pair of curved mounting portions 145 is formed at an opposite end of the clip 14, the mounting portions 145 being received in the corresponding mounting troughs 1131 of the housing 11. A curved securing portion 146 is formed between the mounting portions 145, the securing portion 146 mating with the holding surface 1134 at the notch 1133 of the housing 11.

The lever 15 is substantially a crank, and comprises a driver portion 151 and a driven portion 152 substantially perpendicular to the driver portion 151. An offset fastening portion 153 is formed at a center of the driven portion 152.

The driven portion 152 of the lever 15 is positioned on the braces 1122 of the housing 11, and disposed in a gap defined between the baffle 124 of the reinforcing plate 12 and the front side 112 of the housing 11. The baffle 124 prevents the lever 15 from breaking away from two braces 1122 of the housing 11.

Once the LGA package is positioned on the housing 11, the clip 14 is rotated down onto the LGA package, with the clasping portion 141 resting on the LGA package. The engagement portion 142 of the clip 14 is received in the clip-receiving trough 1121 of the housing 11. The lever 15 is rotated down, with the fastening portion 153 engaging and pressing on the engagement surface 144 of the clip 14. The driver portion 151 of the lever 15 is locked under the locking hook 1142 of the housing 11. In this position, the clip 14 is pressed by the lever 15, and the clasping portions 141 of the clip 14 press on the LGA package. The force of the clip 14 operating on the LGA package provides firm mechanical and electrical connection between the contacts pads of the LGA package and respective contacts of the housing 11. The rigidity of the housing 11 is enhanced by the rigid reinforcing plate 12 attached on the housing 11. Thus the housing 11 resists bending up at the front and rear sides 112, 113 when the clasping portions 141 of the clip 14 press on the left and right sides 114, 115 of the housing 11. Accordingly, the forces that the housing 11 applies on the clip 14 and the lever 15 are not diminished, and the force that the clip 14 applies on the LGA package is not diminished. Therefore, firm and reliable electrical connection between the contacts pads of the LGA package and respective contacts of the housing 11 is assured.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

What is claimed is:

1. A land grid array (LGA) socket comprising:

an insulative housing receiving a multiplicity of electrical contacts;

a reinforcing plate attached on the housing; and a clip and a lever respectively mounting on two opposite ends of the housing;

wherein the lever comprises a driving portion and a driven portion, a baffle depends from a side of the reinforcing plate, and the baffle prevents the lever from disengaging the housing; and wherein the housing defines an electric section, a plurality of second troughs are defined in the housing around the electric section, and a plurality of flakes extend from the reinforcing plate corresponding to the troughs of the housing; and wherein the housing defines a front side, a rear side, a left side and a right side, a pair of braces extends from two opposite ends respectively of the front side for holding the lever; and wherein the housing defines a generally trapezoidal clip-receiving trough in the front side thereof, the clip-receiving trough defines a pair of opposite openings in opposite external surfaces of the housing; and wherein the housing defines a pair of first troughs on one end of the housing, a notch is defined in a center of the rear side, the clip defines a pair of curved mounting portions being received in the corresponding mounting troughs of the housing, a curved securing portion is formed between the mounting portions mating with the notch of the housing; and wherein an engagement portion extends from one end of the clip bending to the housing and received in the clip-receiving trough of the housing; and wherein the curved mounting portions of the clip being received in the corresponding mounting troughs of the housing, and the camber securing portion mating with the notch of the housing; and wherein opposite lateral sides of the clip are bent slightly downwardly to form a pair of clasping portion; and wherein an offset fastening portion formed at a center of the driven portion of the lever, the offset fastening portion engaging and pressing on the engagement surface of the clip; and wherein the reinforcing plate is made of metal; and wherein a baffle depends from one side of the reinforcing plate, the baffle being located between the braces of the housing and stay a gap toward the front side of the housing after the reinforcing plate being installed on the housing.

2. An electrical connector comprising:

an insulative housing receiving a multiplicity of electrical contacts;

a reinforcing plate attached on the housing; and a clip and a lever respectively mounting on two opposite ends of the housing, the lever comprising a driven portion defining an pivot axis about which a fastening portion of said lever is rotated to engage with the clip, wherein said housing and said reinforcing plate cooperate with each other to commonly retain the driven portion in position; and wherein said driven portion is immoveable in both vertical and horizontal directions; and wherein said driven portion is substantially sandwiched between the housing and the reinforcing plate; and wherein said driven portion is sandwiched between an end face of the housing and a baffle which integrally extends from an upward horizontal plane of the reinforcing plate; and wherein the housing defines a front side, a rear side, a left side and a right side, a pair of braces extends from two opposite ends respectively of the front side for holding the lever; and wherein a baffle depends from one side of the reinforcing plate, the baffle being located between the braces of the housing and stay a gap toward the front side of the housing after the reinforcing plate being installed on the housing.

* * * * *